Oct. 20, 1931.  A. CHAMBERS  1,827,780

FRUIT SPOON

Filed May 29, 1930

Inventor,
Alexander Chambers,

By Minturn & Minturn

Attorneys.

Patented Oct. 20, 1931

1,827,780

UNITED STATES PATENT OFFICE

ALEXANDER CHAMBERS, OF INDIANAPOLIS, INDIANA, ASSIGNOR OF ONE-HALF TO DELOS A. ALIG, OF INDIANAPOLIS, INDIANA

FRUIT SPOON

Application filed May 29, 1930. Serial No. 457,007.

This invention relates to fruit spoons with serrated edges with which to cut the fibrous material of grapefruit, oranges, and the like when such fruit is eaten.

The object of the invention is so to shape and dispose the teeth of the serrations that they will readily cut the fibers and sever a mouthful of the fruit by thrust movements of the spoon therein without squirting the juice and pulp and also so to shape and dispose the teeth that they will not cut the mouth of the person eating with the spoon.

Figure 1:
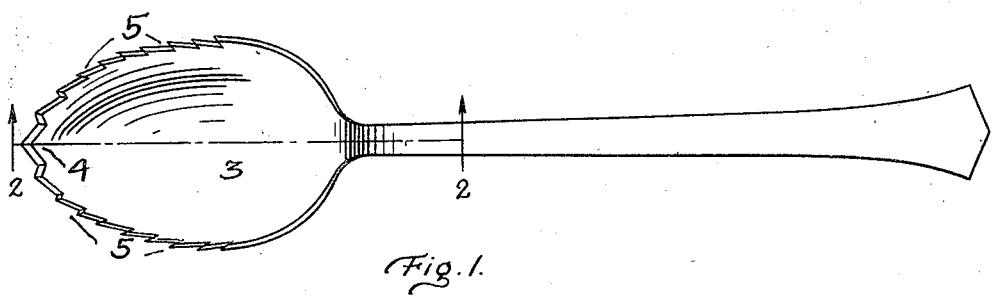
Figure 2:
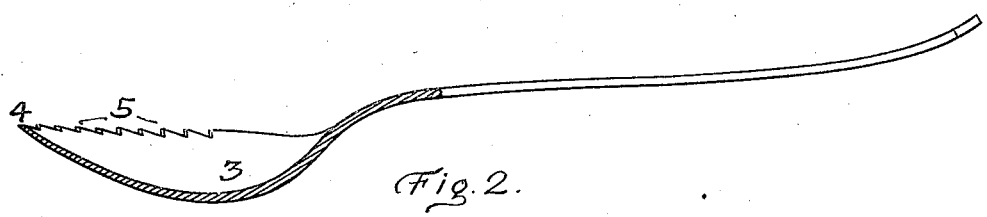

I accomplish the above and other objects which will hereinafter appear by the means illustrated in the accompanying drawings, in which Fig. 1 is a top plan view of a spoon embodying my invention and Fig. 2 is a side elevation and section on the line 2—2 of Fig. 1.

Like characters of reference indicate like parts in the two views.

The curvature of the bowl 3 of the spoon is preferably less, from the tip or fore end, in for approximately half of the length of the bowl than in spoons as commonly made, to increase the cutting efficiency and also to enable the upper lip of the eater using it to contact the bottom of the bowl in transferring its contents to his mouth.

At the tip end of the bowl is a tooth 4 having beveled edges of like angularity or slope, adapting it to penetrate the fruit by severing the fibers straight ahead or by pressing them aside.

The adjacent edges of the bowl, on each side, from the tooth 4 back to the places of its maximum width, are formed with teeth 5, which, instead of having sides of equal length, like the tooth 4, have sides next to the tooth 4, so much shorter than their opposite ones that all of the teeth 5 slope toward tooth 4. The major portion of them, being those farthest from the tooth 4 are undercut on their short sides. This is for the purpose, first, of preventing the fibers of the fruit from slipping past the tooth, thereby insuring the cutting of the fibers and prevent compression and squirting of juice and pulp, and second, to guard against cutting the lips of the user when the spoon is withdrawn from his mouth. The sloping sides of all of the teeth are preferably beveled as shown to sharpen the cutting edges.

In the use of my improved spoon the shape of the teeth of the serrated edges enables it, by a thrust movement into the fruit, previously cut in half in the usual way, to cut the fibers and cells without mashing them and separate a portion of the juicy pulp without compressing it and causing the juice to squirt. This portion, separated, is at once transferred on the spoon into the user's mouth, and as it has considerable bulk, he intuitively opens his mouth wide enough to admit it and also the spoon, without any danger of injurious contact between the lips of the eater and the serrations of the spoon. The danger, with a spoon having serrations with equal sides, is in sawing the mouth in the operation of withdrawing the spoon, but, where the serrations on the sides of the bowl slope toward the point of the bowl, the withdrawal of the spoon is accomplished without any engagement of its serrations with the lips of the user, even though the upper lip of the user is pressing against the inside of the bowl to remove the contents.

I claim:

1. A spoon for eating fruit having a bowl with its front and side edges serrated, the sides of the serrations next to the handle being longer than the sides next to the front end of the bowl, those serrations on the side edges of the bowl being undercut and sharpened.

2. A spoon for eating fruit having a bowl with its front and side edges serrated the sides of the serrations on the side edges being much longer toward the handle and having the sides of the serrations toward the front end of the bowl sharpened.

3. A spoon for eating fruit having a bowl with its front and side edges serrated those on the side edges being undercut and having all of the sides of the serrations sharpened and the sides of the serrations of the sides of the bowl being much longer next to the handle.

4. A spoon for eating citrus fruits having a bowl with serrations about its front and side edges, said serrations being of relatively short length and all forwardly directed.

In testimony whereof I affix my signature.

ALEXANDER CHAMBERS.